United States Patent [19]

Hirai et al.

[11] Patent Number: 5,679,743
[45] Date of Patent: Oct. 21, 1997

[54] POLYACETAL RESIN COMPOSITION AND SLIDING MEMBER

[75] Inventors: Kazuo Hirai, Kamakura; Kingo Miyasaka, Ayase; Masayuki Rokugawa, Hiratsuka; Katsumi Minou, Fujisawa, all of Japan

[73] Assignee: Oiles Corporation, Japan

[21] Appl. No.: 586,226

[22] Filed: Jan. 16, 1996

Related U.S. Application Data

[63] Continuation of Ser. No. 220,389, Mar. 31, 1994, abandoned.

[30] Foreign Application Priority Data

Apr. 2, 1993 [JP] Japan ..................... 5-100281

[51] Int. Cl.$^6$ .......................... C08L 23/20; C08L 23/16; C08L 23/08; C08L 31/04
[52] U.S. Cl. .................. 525/88; 525/92; 525/95; 525/98; 525/154; 525/155; 525/222; 525/227; 525/232; 525/240; 525/241; 525/401; 525/404; 525/408; 525/409
[58] Field of Search .................. 525/88, 92, 95, 525/98, 154, 155, 222, 227, 232, 240, 241, 401, 404, 408, 409

[56] References Cited

U.S. PATENT DOCUMENTS

| | | | |
|---|---|---|---|
| 4,041,002 | 8/1977 | Aboshi et al. | 260/30.6 R |
| 4,628,072 | 12/1986 | Shiraki et al. | 525/57 |
| 4,877,827 | 10/1989 | Van Derbroep | 524/477 |
| 5,318,813 | 6/1994 | Flexman, Jr. | 428/36.9 |

FOREIGN PATENT DOCUMENTS

| | | |
|---|---|---|
| 0 354 802 | 2/1990 | European Pat. Off. . |
| 46-42217 | 12/1971 | Japan . |
| 48-37572 | 11/1973 | Japan . |
| 56-34026 | 8/1981 | Japan . |
| 62-253650 | 11/1987 | Japan . |
| 2-138357 | 5/1990 | Japan . |
| 3-111446 | 5/1991 | Japan . |
| 4-3784 | 1/1992 | Japan . |
| 4-3785 | 1/1992 | Japan . |
| 2 053 238 | 2/1981 | United Kingdom . |
| WO92/07033 | 4/1992 | WIPO . |

OTHER PUBLICATIONS

Database WPI Week 9212, Derwent Publications Ltd. London, GB; AN 92-093019 & JP-A-4 036 341 (Asahi Chemical Ind. KK) 6 Feb. 1992 Abstract.

Wen–Yen Chiang et al. "Properties of copolymer–type polyacetal/ethylene..." Journal of Applied Polymer Science, 47 (1993) Jan. 5, No. 1, New York, US, pp. 105–112.

*Primary Examiner*—W. Robinson H. Clark
*Attorney, Agent, or Firm*—Nixon & Vanderhye

[57] ABSTRACT

The disclosure describes a polyacetal resin composition comprising 100 parts by weight of a polyacetal resin (A), 0.3 to 10 parts by weight of an olefin copolymer (B) composed of 30 to 70 wt % of ethylene-propylene-diene rubber ($B_1$), 30 to 70 wt % of an ethylene-vinyl acetate copolymer ($B_2$) with a vinyl acetate content of 18 to 40 wt % and 1 to 25 wt % of an ethylene-($C_{4-6}$)olefin-1 copolymer ($B_3$), and 0.1 to 10 parts by weight of a styrene-based thermoplastic elastomer (C) having a functional group.

25 Claims, No Drawings

POLYACETAL RESIN COMPOSITION AND SLIDING MEMBER

This is a continuation of application Ser. No. 08/220,389, filed 31 Mar. 1994, now abandoned.

BACKGROUND OF THE INVENTION

The present invention relates to a polyacetal resin composition and a sliding member composed of the polyacetal resin composition. More particularly, it relates to a polyacetal resin composition for a sliding member which has an excellent workability (moldability) for molding such as an injection molding without causing a separation and/or bleeding of the ingredients thereof, and a sliding member composed of the polyacetal resin composition, which is remarkably improved in sliding characteristics such as a friction coefficient and a wear resistance with no deterioration of mechanical properties, and substantially prevents generation of frictional sound (grating sound) on sliding.

Polyacetal resins have excellent mechanical properties, frictional and wear characteristics, heat and chemical resistance properties and electrical properties, and are widely utilized as engineering plastic for manufacture of various kinds of machine parts such as automobile parts, and parts of electrical and electronic devices. With the increasing tendency of the miniaturization and light-weight of these parts, there is an increasing request for a sliding member material which is improved in sliding characteristics such as a friction coefficient and a wear resistance without lowering the mechanical properties and generates no grating sound on sliding. Several proposals have been made for improving such sliding characteristics and preventing generation of the grating sound.

Japanese Patent Publication (KOKOKU) No. 46-42217 proposes a process for producing the lubricating parts such as bearings, which comprises preparing a thermoplastic synthetic resin powder composed of a polyacetal or polyamide; mixing a lubricating oil therewith and stirring the resultant mixture so that the lubricating oil is uniformly deposited on the resin powder-particle surfaces; melting, kneading and granulating the obtained mixture by a granulator in which the molding material feed section of a heating cylinder is kept at a low temperature below the melting point of the synthetic resin by a cooling means, while the other section of the heating cylinder is maintained at a temperature above the melting point of the synthetic resin; and molding the granulated material into a desired form.

Japanese Patent Publication (KOKOKU) No. 48-37572 (U.S. Pat. No. 3,779,918) proposes an oil-containing plastic composition for a sliding member, obtained by adding at least one of a saturated or unsaturated higher fatty acid, or a salt, ester, amide, chlorinated compound or metallic soap thereof to a carrier having a surface area of not less than 0.01 m²/g and having a melting point higher than the molding temperature of a base plastic or having a viscosity higher than the melt viscosity of the base plastic at the molding temperature thereof, mixing the resulting material with the base plastic such as a polyamide, polyacetal, polycarbonate or the like, and molding the resultant mixture into a desired form.

Japanese Patent Application Laid-Open (KOKAI) No. 62-253650 proposes a sliding member composition comprising 98 to 70 wt % of a polyacetal and 2 to 30 wt % of a polyethylene having a melt index (MI) of not less than 10.

However, the sliding member comprising the said polyacetal resin compositions are not necessarily improved to a satisfactory degree in prevention of generation of frictional sound (grating sound) on sliding movements and also have the problems in workability for molding such as injection molding. Especially, with the production process disclosed in Japanese Patent Publication (KOKOKU) No. 46-42217, it is hardly possible to produce a satisfactory molded product under the ordinary molding conditions, since temperature control is required for the respective sections of the molding machine.

As a result of the present inventors' earnest studies for overcoming the problems such as mentioned above, it has been found that a sliding member composed of a polyacetal resin composition obtained by blending 100 parts by weight of a polyacetal resin, 0.3 to 10 parts by weight of an olefin copolymer composed of 30 to 70 wt % of ethylene-propylene-diene rubber ($B_1$), 30 to 70 wt % of ethylene-vinyl acetate copolymer ($B_2$) with a vinyl acetate content of 18 to 40 wt % and 1 to 25 wt % of copolymer ($B_3$) of ethylene and ($C_{4-6}$)olefin-1, and 0.1 to 10 parts by weight of a styrene-based thermoplastic elastomer (C) having a functional group, has excellent sliding characteristics such as a friction coefficient and a wear resistance without lowering inherent mechanical properties of a polyacetal resin, substantially prevents generation of frictional sound (grating sound) on sliding and also has excellent moldability. The present invention has been attained on the basis of the above finding.

SUMMARY OF THE INVENTION

It is an object of the present invention to provide a polyacetal resin composition which has an excellent workability (moldability) for molding such as an injection molding without causing a separation and/or bleeding of the ingredients thereof.

It is an another object of the present invention to provide a sliding member composed of the polyacetal resin composition, which is remarkably improved in sliding characteristics such as a friction coefficient and a wear resistance with no deterioration of mechanical properties, and substantially prevents generation of frictional sound (grating sound) on sliding.

To accomplish the said aims, in a first aspect of the present invention, there is provided a polyacetal resin composition comprising 100 parts by weight of a polyacetal resin (A), 0.3 to 10 parts by weight of an olefin copolymer (B) composed of 30 to 70 wt % of ethylene-propylene-diene rubber ($B_1$), 30 to 70 wt % of an ethylene-vinyl acetate copolymer ($B_2$) with a vinyl acetate content of 18 to 40 wt % and 1 to 25 wt % of an ethylene-($C_{4-6}$)olefin-1 copolymer ($B_3$), and 0.1 to 10 parts by weight of a styrene-based thermoplastic elastomer (C) having a functional group.

In a second aspect of the present invention, there is provided a polyacetal resin composition comprising 100 parts by weight of a polyacetal resin (A), 0.3 to 10 parts by weight of an olefin copolymer (B) composed of 30 to 70 wt % of ethylene-propylene-diene rubber ($B_1$), 30 to 70 wt % of an ethylene-vinyl acetate copolymer ($B_2$) with a vinyl acetate content of 18 to 40 wt % and 1 to 25 wt % of an ethylene-($C_{4-6}$)olefin-1 copolymer ($B_3$), 0.1 to 10 parts by weight of a styrene-based thermoplastic elastomer (C) having a functional group, and 0.1 to 10 parts by weight of a lubricant.

In a third aspect of the present invention, there is provided sliding member comprising a polyacetal resin composition composed of 100 parts by weight of a polyacetal resin (A), 0.3 to 10 parts by weight of an olefin copolymer (B)

composed of 30 to 70 wt % of ethylene-propylene-diene rubber ($B_1$), 30 to 70 wt % of an ethylene-vinyl acetate copolymer ($B_2$) with a vinyl acetate content of 18 to 40 wt % and 1 to 25 wt % of an ethylene-($C_{4-6}$)olefin-1 copolymer ($B_3$), and 0.1 to 10 parts by weight of a styrene-based thermoplastic elastomer (C) having a functional group.

In a fourth aspect of the present invention, there is provided a sliding member comprising a polyacetal resin composition composed of 100 parts by weight of a polyacetal resin (A), 0.3 to 10 parts by weight of an olefin copolymer (B) composed of 30 to 70 wt % of ethylene-propylene-diene rubber ($B_1$), 30 to 70 wt % of an ethylene-vinyl acetate copolymer ($B_2$) with a vinyl acetate content of 18 to 40 wt % and 1 to 25 wt % of an ethylene-($C_{4-6}$)olefin-1 copolymer ($B_3$), 0.1 to 10 parts by weight of a styrene-based thermoplastic elastomer (C) having a functional group, and 0.1 to 10 parts by weight of a lubricant.

DETAILED DESCRIPTION OF THE INVENTION

For preparation of polyacetal resin (A), there can be used polyacetal homopolymers as well as polyacetal copolymers in which the most part of the main chain is composed of an oxymethylene unit. It is also possible to use resins obtained by modifying polyacetals through crosslinking or graft copolymerization in a known method.

The molecular weight (number-average molecular weight) of polyacetal resin (A) is not specified as far as this resin is capable of molding, but usually it is in the range of 20,000 to 80,000. Of these polyacetal resins (A), those having relatively good fluidity, for example, those having a melt flow rate of not less than 4 g/10 min as measured by ASTM-D-1238 method, are preferred.

Typical examples of polyacetal resins (A) are a formaldehyde homopolymer having a molecular weight of 50,000 to 70,000 (DELRIN, produced by E. I. Du Pont de Nemours & Company) and a trioxane-ethylene oxide (100/about 0.1 to 15) copolymer having a molecular weight of about 50,000 (DURACON, produced by Polyplastics Co., Ltd.).

Olefin copolymer (B) is composed of 30 to 70 wt %, preferably 45 to 50 wt % of ethylene-propylene-diene rubber ($B_1$), 30 to 70 wt %, preferably 45 to 50 wt % of ethylene-vinyl acetate copolymer ($B_2$) with a vinyl acetate content of 18 to 40 wt %, preferably 25 to 30 wt %, and 1 to 25 wt %, preferably 2 to 15 wt % of ethylene-($C_{4-6}$)olefin-1 copolymer ($B_3$). Olefin copolymer (B) can be obtained by reacting the above component materials ($B_1$) to ($B_3$) at a temperature of 150° to 300° C., preferably 200° to 250° C.

The ethylene-propylene-diene rubber ($B_1$) used in the present invention is preferably one in which the ethylene content is 45 to 80 wt % and the diene component is dicyclopentadiene, ethylidene norvornene or 1,4-hexadiene. The ethylene-propylene-diene rubber in which the ethylene content is 65 to 75 wt % and the diene component is dicyclopentadiene, is especially preferred.

The ethylene-vinyl acetate copolymer ($B_2$) is preferably one having a vinyl acetate content of 18 to 45 wt %, preferably 25 to 30 wt %, and a melt index of 0.5 to 25 g/10 min. The ethylene-vinyl acetate copolymer having a vinyl acetate content of 25 to 30 wt % and a melt index (MI) of 7 to 11 g/10 min is especially preferred.

The ethylene-($C_{4-6}$)olefin-1 copolymer ($B_3$) is preferably a branched olefin polymer such as ethylene-butene-1 copolymer and ethylene-hexene-1 copolymer.

Of the above-mentioned olefin copolymers (B), those in which the mixing ratio of ethylene-propylene-diene rubber ($B_1$)/ethylene-vinyl acetate ($B_2$) is 47-53/53-47, preferably 49-51/51-49, more preferably about 50/50 (by weight), are preferred. An especially preferred example of such olefin copolymers (B) used in the present invention is "BENNET" (trade name, sold by Nagase Sangyo Co., Ltd.).

The styrene-based thermoplastic elastomer (C) having a functional group added thereto is described below.

The backbone of the said styrene-based thermoplastic elastomer (C) is preferably a triblock copolymer in which the hard segment is polystyrene and the soft segment is polybutadiene, polyisoprene or hydrogenated polymer thereof. Typical examples of such triblock copolymers are polystyrene-polybutadiene-polystyrene block copolymer, polystyrene-polyisoprene-polystyrene block copolymer, polystyrene-poly(ethylene.butylene)-polystyrene block copolymer, and polystyrene-poly(ethylene-propylene)-polystyrene block copolymer.

As the functional groups to be added to the said elastomer in the present invention, maleic acid, endocis-dicyclo[2,2,1]hepto-5-ene-2,3-dicarboxylic acid (nadic acid), maleic anhydride, citraconic anhydride, itaconic anhydride, tetrahydrophthalic anhydride, nadic anhydride, methylnadic anhydride, monomethyl maleate, dimethyl maleate, dimethyl itaconate, dimethyl citraconate, maleimide and malenyl chloride graft monomers may be exemplified. Maleic acid, nadic acid and their anhydrides are preferred.

In the styrene-based thermoplastic elastomer (C) having a functional group, the styrene content is preferably 20 to 30 wt % and the content of the added functional group is preferably 0.005 to 4.76 wt %. A typical example of the said styrene-based elastomers (C) is "TUFTEC M" (trade name, produced by Asahi Chemical Industry Co., Ltd.). The soft segment of "TUFTEC M" is a hydrogenated polymer of polybutadiene, and the functional group is maleic anhydride.

As for the contents of the said respective components of the polyacetal resin composition of the present invention, the content of the olefin copolymer (B) is 0.3 to 10 parts by weight, preferably 0.5 to 7 parts by weight, more preferably 1 to 5 parts by weight, and the content of the styrene-based thermoplastic elastomer (C) having a functional group added thereto is 0.1 to 10 parts by weight, preferably 0.3 to 6 parts by weight, more preferably 0.5 to 3 parts by weight, based on 100 parts by weight of polyacetal resin (A).

When the content of the said olefin copolymer (B) or styrene-based thermoplastic elastomer (C) is too low, it is impossible to obtain the desired sliding characteristics, especially frictional sound prevention effect, and moldability for injection molding, and when the content is too large, the mechanical properties such as stiffness of the produced sliding member are deteriorated.

The polyacetal resin composition of the present invention composed of the components (A), (B) and (C) described above, has excellent properties and especially has excellent effects on prevention of generation of frictional sound on sliding movement of the sliding member and workability (moldability) for molding. The sliding characteristics are even more bettered by further addition of a lubricant (D) to the said polyacetal resin composition.

The lubricant (D) is not subject to any specific restrictions, and it may be solid at ordinary temperature if it is turned into liquid at the molding temperature of the resin composition. As the lubricants (D) usable in the present invention, mineral oils, hydrocarbons, fatty acid esters, synthetic oils, animal and vegetable oils, metallic soaps and natural waxes may be exemplified.

Examples of the mineral oils usable as lubricant (D) used in the present invention are a spindle oil, an engine oil, a turbine oil, a dynamo oil, a refrigerator oil, a cylinder oil and a gear oil. Examples of the hydrocarbons usable as lubricant (D) are a liquid paraffin, paraffin waxes, polyethylene waxes and the like. Examples of the fatty acid esters are stearyl stearate, behenyl behenate, glycerin monostearate and the like.

Examples of the synthetic oils usable as lubricant (D) are polyglycol, polyphenyl ether, silicone and the like. Examples of the animal and vegetable oils are a whale oil, a castor oil, a jojoba oil and the like. Examples of the metallic soaps are calcium stearate, zinc stearate and the like. Examples of the natural waxes are a carnauba wax, a montan wax and the like.

Of the above-mentioned lubricants, an engine oil, a turbine oil, a cylinder oil and a liquid paraffin are especially preferred.

The content of the lubricant (D) in the resin composition is not more than 10 parts by weight, preferably 0.1 to 10 parts by weight, more preferably 0.5 to 7 parts by weight, even more preferably 1 to 5 parts by weight, based on 100 parts by weight of polyacetal resin. When the lubricant content is too large, the inherent properties of polyacetal resin are deteriorated.

In the polyacetal resin composition of the present invention, there may be added, if necessary, a solid lubricant such as molybdenum disulfide, graphite, polytetrafluoroethylene or the like; a fibrous material such as glass fiber, carbon fiber, aramide fiber, potassium titanate fiber and whisker or the like; and an inorganic filler such as glass powder, talc, clay, calcium carbonate, zinc oxide or the like as far as addition of these additives is not harmful to the purpose of the present invention.

The total content of the said solid lubricant, fibrous material and/or inorganic filler in the polyacetal resin composition is preferably not more than 30 wt %.

It is also possible to add various known stabilizers for reinforcing stability of the polyacetal resin composition. There may further be blended a known additive(s) for improving properties of the polyacetal resin composition according to the intended purpose of use of the polyacetal resin composition. As such additives, various kinds of colorant, releasing agent (other than the above-mentioned lubricants), antistatic agent and surfactant may be exemplified.

The polyacetal resin composition of the present invention can be easily prepared by a known method generally used for preparation of resin compositions. For instance, there may be employed a process which comprises mixing the respective component materials, and kneading and extruding the resultant mixture by a single- or twin-screw extruder to form the pellets, or a process which comprises preparing once pellets of different compositions (masterbatches) and mixing predetermined amounts of such pellets with other resin composition to dilute the concentration thereof.

The sliding member according to the present invention are made of the above-described polyacetal resin composition and can be easily produced by using a conventional injection molding machine or pressure molding machine (extruder). The polyacetal resin composition of the present invention is also excellent in smooth advance properties (biting properties) at the time of molding [properties whether the molding material can advance smoothly through the cylinder by rotating the screw], hence very excellent molding workability (moldability), and the sliding member of the present invention has excellent mechanical properties and excellent sliding characteristics such as a friction coefficient and a wear resistance, and can prevent generation of frictional sound (grating sound) on sliding movement.

As is seen from the Examples described later, the polyacetal resin composition and sliding member of the present invention produces the following effects owing to addition of a specific olefin copolymer and a specific styrene-based elastomer to a polyacetal resin.

(1) Generation of frictional sound (grating sound) on sliding movement is prevented or minimized to the utmost. For example, when a sliding member made of the resin composition of the present invention is slid against a mating member made of a polyacetal resin at a speed of 1.5 m/min, there is generated no frictional sound (grating sound) even under a load of 20 kg/cm$^2$.

(2) Molding workability (moldability) is improved. That is, biting properties is bettered. For instance, when the screw speed is 150 r.p.m., the back pressure is 5 kg/cm$^2$, the cylinder temperature is 190° C./190° C./190° C./180° C. and the product weight is 16 g, the the measuring time (biting time) [the time required to feed an amount of the product weight of the molding material to a front zone of the cylinder] is not more than 5 seconds.

(3) No peeling takes place at the surface of the molded product, and the product shows an excellent surface condition.

(4) Sliding characteristics are excellent. For example, when the material of the mating member (against which the sliding member of the present invention is slid) is structural carbon steel (S45C) and sliding is performed at a speed of 10 m/min under a load of 20 kg/cm$^2$, the sliding member of present invention shows a stabilized friction coefficient and is also very small in the abrasion amount. Also, when the material of the mating member is polyacetal resin and sliding is performed at a speed of 5 m/min under a load of 3 kg/cm$^2$, the total abrasion amount of the sliding member and the mating member is reduced to ⅓ to ⅟18 in comparison with the conventional products, for example, it is preferred that the total abrasion amount of the sliding member and the mating member is not more than 40 μm, more preferably not more than 20 μm.

Since the sliding member of the present invention has the excellent properties such as mentioned above, the member can be advantageously applied to the sliding elements such as bearings, gears, guide rollers, etc., in audio and video devices, facsimiles, computers, etc., as well as to the mechanical elements such as chassis, plates, etc., which are slid against the said elements.

EXAMPLES

The present invention is further described below with reference to the examples, which examples, however, are merely intended to be illustrative and not to be construed as limiting the scope of the invention.

Evaluation of the polyacetal resin composition and the sliding member of the present invention were conducted by the followings.

(1) Frictional sound (grating sound) on sliding

By using a Thrust Type Friction Tester (manufactured by Suzuki Model Co., Ltd), load was applied cumulatively to the sliding member with an increment of 2.5 kg/cm$^2$ every 30 minutes under the conditions specified below and the load (kg/cm$^2$) under which a grating sound was generated, was evaluated according to a 1 to 4-point rating system as shown below.

| Measuring conditions | |
|---|---|
| Sliding speed: | 1.5 m/min |
| Test piece: (Sliding member) | Cylindrical sliding member (inner diameter: 20 mm, outer diameter: 25.6 mm, length: 25 mm) |
| Mating member: | Square mating member (polyacetal resin "DURACON M-90" (trade name, produced by Polyplastics Co., Ltd), 30 mm on one side and 3 mm in thickness) |
| Lubricant: | No lubrication |
| Test method: | An end face of the test piece (cylindrical sliding member) was contacted to the mating member, and the said test piece was turned at the above-shown sliding speed. |

| Evaluation method | |
|---|---|
| Load (kg/cm$^2$) when caused generation of grating sound | Rating |
| not more than 2.5 | 1 |
| 5.0 to 7.5 | 2 |
| 10.0 to 15.0 | 3 |
| 17.5 to 22.5 | 4 |

(Notes) It is desirable that the test piece has a rating of 3 or 4 in the above rating system.

(2) Sliding characteristics (friction coefficient and abrasion amount)

(2-1) By using the Thrust Type Friction Tester (manufactured by Suzuki Model Co., Ltd), the friction coefficient and abrasion amount were measured under the following conditions.

| Measuring conditions | |
|---|---|
| Sliding speed: | 10 m/min |
| Load: | 20 kg/cm$^2$ |
| Test time: | 20 hr |
| Test Piece: (Sliding member) | Cylindrical sliding member (inner diameter: 20 mm, outer diameter: 25.6 mm, length: 25 mm) |
| Mating member: | Cylindrical mating member (structural carbon steel (S45C), inner diameter: 15 mm, outer diameter: 30 mm, length: 15 mm; end face was finished with #600 emery paper |
| Lubricant: | No lubrication |
| Test method: | The test piece was fixed, and with an end face of the mating member contacted to the corresponding end face of the said test piece, the mating member was turned at the above-shown sliding speed. |

(2-2) By using the Thrust Type Friction Tester (manufactured by Suzuki Model Co., Ltd), the friction coefficient and abrasion amount were measured under the following conditions.

| Measuring conditions | |
|---|---|
| Sliding speed: | 5 m/min |
| Load: | 3 kg/cm$^2$ |
| Test time: | 8 hr |
| Test piece: (Sliding member) | Cylindrical sliding member (inner diameter: 10 mm, outer diameter: 14 mm, length: 10 mm) |

| Measuring conditions | |
|---|---|
| Mating member: | Square mating member (polyacetal resin "DURACON M-90" (trade name, produced by Polyplastics Co., Ltd), 30 mm on one side and 3 mm in thickness) |
| Lubricant: | No lubrication |
| Test method: | The square mating member was fixed, and with an end face of the test piece contacted to the mating member, the test piece was turned at the above-shown sliding speed. |

(3) Surface condition of molded product

By using a screw-type injection molding machine (SG50, manufactured by Sumitomo Heavy Machinery Co., Ltd.), there were molded 50 test pieces (70 mm in diameter and 3 mm in thickness) according to the side-gate system under the following conditions, and the state of peel near the gate was visually observed. The evaluation method is as shown below.

| Measuring conditions | |
|---|---|
| Cylinder temperature: | 190/190/190/180(°C.) |
| Injection pressure: | 1,000 kg/cm$^2$ |
| Injection speed: | 1.5 m/min |

| Evaluation method | |
|---|---|
| Number of the test pieces which suffered peel in total 50 test pieces tested | Rating |
| not less than 5 | 1 |
| 1 to 4 | 2 |
| 0 | 3 |

(Notes) It is desirable that the test piece has a rating of 3 in the above rating system.

(4) Biting properties

By using a screw-type injection molding machine (SG50 manufactured by Sumitomo Heavy Machinery Co., Ltd.), there were molded the 16 g products under the conditions shown below and the biting time during molding was evaluated according to the rating system shown below.

| Measuring conditions | |
|---|---|
| Cylinder temperature: | 190/190/190/180 (°C.) |
| Screw speed: | 150 r.p.m. |
| Back pressure: | 5 kg/cm$^2$ |
| Screw diameter | 25 mm |

| Evaluation method | |
|---|---|
| Biting time (sec.) | Rating |
| over 10 | 1 |
| 7 to 10 | 2 |
| 5 to 7 | 3 |
| less than 5 | 4 |

(Notes) It is desirable that the molding material (test piece) has a rating of 3 or 4.

Example 1

First, an olefin copolymer (B) was prepared in the following method.

45 parts by weight of ethylene-propylene-diene rubber, as component (B$_1$), with an ethylene content of 70 wt % and with dicyclopentadiene used as diene component, 45 parts by weight of ethylene-vinyl acetate copolymer, as component ($B_2$), with a vinyl acetate content of 28 wt %, and 10 parts by weight of a copolymer of low-density polyethylene of hexene-1, as component ($B_3$), were supplied into a screw-type extruder and the resultant mixture was melted and kneaded to carry out the reaction at a temperature of 200° C. and then pelletized to obtain pellets of an olefin copolymer.

0.5 parts by weight of the above olefin copolymer and 0.5 parts by weight of a styrene-based thermoplastic elastomer having maleic anhydride added as functional group (TUFTEC M (trade name) produced by Asahi Chemical Industry Co., Ltd.) were added to 100 parts by weight of a polyacetal resin (DURACON M90 (trade name) produced by Polyplastic Co., Ltd.) [melt flow rate: 9 g/10 min] and stirred and mixed by a high-speed mixer to obtain a mixture. The resultant mixture was supplied into a twin-screw vent type extruder, thereby melted and kneaded and then pelletized to obtain pellets of a molding material.

This molding material was injection molded by a screw-type injection molding machine (SG50, manufactured by Sumitomo Heavy Machinery Co., Ltd.; screw diameter: 25 mm) at screw speed of 150 r.p.m., back pressure of 5 kg/cm² and cylinder temperature of 190/190/190/180(° C.) to obtain a sliding member. The evaluation results are shown in Table 1.

Example 2

The same procedure as Example 1 was carried out except that the amounts (parts by weight) of the olefin copolymer and the styrene-based thermoplastic elastomer were changed as shown in Table 1 to obtain a sliding member. The evaluation results are shown in Table 1.

Example 3

The same procedure as Example 1 was carried out except that a lubricant (MORESCOWHITE P-350P (trade name) produced by Matsumura Petroleum Laboratory, paraffin oil) was used as an extra component in an amount of one part by weight to obtain a sliding member. The evaluation results are shown in Table 1.

Example 4 and Comparative Examples 1 and 2

The same procedure as Example 1 was carried out except that the amounts (parts by weight) of the olefin copolymer, the styrene-based thermoplastic elastomer and the lubricant were changed as shown in Table 1 to obtain a sliding member. The evaluation results are shown in Table 1.

Comparative Example 3

To the same polyacetal resin as used in Example 1 was added a polyethylene (melt index=15) in a ratio shown in Table 1, and the resultant mixture was injection molded in the same way as in Example 1 to obtain a sliding member. The evaluation results are shown in Table 1.

TABLE 1

|  | Example | | | |
|---|---|---|---|---|
|  | 1 | 2 | 3 | 4 |
| Polyacetal resin | 100 | 100 | 100 | 100 |
| Olefin copolymer | 0.5 | 5 | 0.5 | 5 |
| Styrene-based thermoplastic elastomer | 0.5 | 2 | 0.5 | 2 |
| Polyethylene (MI = 15) | — | — | — | — |
| Lubricant | — | — | 1 | 3 |
| Biting properties | 4 | 4 | 4 | 4 |
| Surface condition (peeling) | 3 | 3 | 3 | 3 |
| Frictional sound (grating sound) on sliding | 3 | 4 | 3 | 4 |
| Sliding characteristics (against metal) | | | | |
| Friction coefficient | 0.30 | 0.26 | 0.18 | 0.16 |
| Abrasion amount (sliding member, μm) | 32 | 28 | 21 | 18 |
| Sliding characteristics (against resin) | | | | |
| Friction coefficient | 0.27 | 0.21 | 0.22 | 0.20 |
| Abrasion amount (μm) | | | | |
| Sliding member | 22 | 8 | 12 | 7 |
| Mating member | 14 | 2 | 4 | 1 |

|  | Comparative Example | | |
|---|---|---|---|
|  | 1 | 2 | 3 |
| Polyacetal resin | 100 | 100 | 100 |
| Olefin copolymer | — | — | — |
| Styrene-based thermoplastic elastomer | — | — | — |
| Polyethylene (MI = 15) | — | — | 5 |
| Lubricant | — | 3 | — |
| Biting properties | 4 | 1 | 3 |
| Surface condition (peeling) | 1 | 1 | 2 |
| Frictional sound (grating sound) on sliding | 1 | 1 | 2 |
| Sliding characteristics (against metal) | | | |
| Friction coefficient | 0.33 | 0.21 | 0.29 |
| Abrasion amount (sliding member, μm) | 47 | 30 | 35 |
| Sliding characteristics (against resin) | | | |
| Friction coefficient | 0.42 | 0.33 | 0.30 |
| Abrasion amount (μm) | | | |
| Sliding member | 30 | 23 | 38 |
| Mating member | 117 | 83 | 65 |

What is claimed is:

1. A polyacetal resin composition for a sliding member comprising:

100 parts by weight of a polyacetal resin (A);

0.3 to 10 parts by weight of an olefin copolymer (B) comprising 30 to 70 wt % of an ethylene-propylene-diene rubber ($B_1$), 30 to 50 wt % of an ethylene-vinyl acetate copolymer ($B_2$) having a vinyl acetate content of 18 to 40 wt %, and 1 to 25 wt % of an ethylene-($C_{4-6}$) olefin-1 copolymer ($B_3$); and 0.1 to 10 parts by weight of a styrene-based thermoplastic elastomer (C) having a functional group consisting essentially of a triblock copolymer consisting essentially of polystyrene as a hard segment and as a soft segment polybutadiene, polyisoprene or hydrogenated polymer thereof.

2. The polyacetal resin composition according to claim 1, wherein the polyacetal resin (A) has a melt flow rate of not less than 4 g/10 min as measured by ASTM-D-1238 and a number-average molecular weight of 20,000 to 80,000.

3. The polyacetal resin composition according to claim 1, wherein the styrene-based thermoplastic elastomer (C) having a functional group has a styrene content of 10 to 30 wt % and a functional group content of 0.005 to 4.76 wt %.

4. The polyacetal resin composition according to claim 1, wherein the triblock copolymer is polystyrenepolybutadiene-polystyrene, polystyrene-polyisoprene-polystyrene, polystyrene-poly(ethylene-butylene)-polystyrene or polystyrene-poly(ethylene.propylene)-polystyrene; and the functional group is selected from the group consisting of maleic acid, nadic acid, maleic anhydride, citraconic anhydride, itaconic anhydride, tetrahydrophthalic anhydride, nadic anhydride, methylnadic anhydride, monomethyl maleate, dimethyl maleate, dimethyl itaconate, dimethyl citraconite, maleimide and malenyl chloride graft monomers.

5. The polyacetal resin composition according to claim 1, wherein the ethylene content of the ethylene-propylene-diene rubber ($B_1$) is 45 to 80 wt % and the diene component of the ethylene-propylene-diene rubber is cyclopentadiene, ethylidene-norbornene or 1,4-hexadiene.

6. The polyacetal resin composition according to claim 1, wherein the melt index of the ethylene-vinyl acetate copolymer ($B_2$) is 0.5 to 25 g/10 min as measured by ASTM-D-1238.

7. The polyacetal resin composition according to claim 1, wherein the ethylene-($C_{4-6}$)olefin-1 copolymer ($B_3$) is ethylene butene-1 copolymer or ethylene-hexene-1 copolymer.

8. The polyacetal resin composition according to claim 1, wherein the mixing ratio of ethylene-propylene-diene rubber/ethylene-vinyl acetate copolymer in the olefin copolymer is 47-53/53-47 (by weight).

9. The polyacetal resin composition according to claim 1, further containing a lubricant (D) in an amount of 0.1 to 10 parts by weight based on 100 parts by weight of the polyacetal resin (A).

10. The polyacetal resin composition according to claim 9, wherein the lubricant (D) is a mineral oil, a hydrocarbon, a fatty acid ester, a synthetic oil, an animal oil, a vegetable oil, a metallic soap, a natural wax or a mixture thereof.

11. The polyacetal resin composition according to claim 1, further containing a solid lubricant, a fibrous material, an inorganic filler or a mixture thereof in an amount of not more than 30 % by weight in the polyacetal resin composition.

12. The polyacetal resin composition according to claim 1 wherein the biting time of the polyacetal resin composition is not more than 5 seconds, when the screw speed is 150 r.p.m., the back pressure is 5 kg/cm², the cylinder temperature is 190° C./190° C./190° C./180° C. and the product weight is 16 g.

13. The sliding member comprising a polyacetal resin composition comprising:

100 parts by weight of a polyacetal resin (A);

0.3 to 10 parts by weight of an olefin copolymer (B) obtained by reacting at a temperature of 150° to 300° C. 30 to 70 wt % of an ethylene-propylene-diene rubber ($B_1$), 30 to 50 wt % of an ethylene vinyl acetate copolymer ($B_2$) having a vinyl acetate content of 18 to 40 wt % and 1 to 25 wt % of an ethylene-($C_{4-6}$) olefin-1 copolymer ($B_3$); and 0.1 to 10 parts by weight of a styrene-based thermoplastic elastomer (C) having a functional group consisting essentially of a triblock copolymer consisting essentially of polystyrene as a hard segment and as a soft segment polybutadiene, polyisoprene or hydrogenated polymer thereof wherein the sliding member generates no grating sound when rubbed against a polyacetal resin mating member under a load of at least 10 kg/cm².

14. The sliding member according to claim 13, wherein no generation of frictional sound (grating sound) even under a load of 20 kg/cm², when slid against a mating member made of a polyacetal resin at a speed of 1.5 m/min.

15. The sliding member according to claim 13, wherein a total abrasion amount of the sliding member and a mating member is not more than 40 μm, when the material of the mating member is polyacetal resin and sliding is performed at a speed of 5 m/min under a load of 3 kg/cm².

16. The sliding member according to claim 13, wherein the polyacetal resin (A) has a melt flow rate of not less than 4 g/10 min as measured by ASTM-D-1238 and a number-average molecular weight of 20,000 to 80,000.

17. The sliding member according to claim 13, wherein the styrene-based thermoplastic elastomer (C) having a functional group has a styrene content of 20 to 30 wt % and a functional group content of 0.005 to 4.76 wt %.

18. The sliding member according to claim 13, wherein the triblock copolymer is polystyrene-polybutadiene-polystyrene, polystyrene-polyisoprene-polystyrene, polystyrene-poly(ethylene.butylene)-polystyrene or polystyrene-poly(ethylene-propylene)-polystyrene; and the functional group is selected from the group consisting of maleic acid, nadic acid, maleic anhydride, citraconic anhydride, itaconic anhydride, tetrahydrophthalic anhydride, nadic anhydride, methylnadic anhydride, monomethyl maleate, dimethyl maleate, dimethyl itaconate, dimethyl citraconate, maleimide and malenyl chloride graft monomers.

19. The sliding member according to claim 13, wherein the ethylene content of the ethylene-propylene-diene rubber ($B_1$) is 45 to 80 wt % and the diene component of the ethylene-propylene-diene rubber is cyclopentadiene, ethylidene-norbornene or 1,4-hexadiene.

20. The sliding member according to claim 13, wherein the melt index of the ethylene-vinyl acetate copolymer ($B_2$) is 0.5 to 25 g/10 min as measured by ASTM-D-1238.

21. The sliding member according to claim 13, wherein the ethylene-($C_{4-6}$)olefin-1 copolymer ($B_3$) is ethylene-butene-1 copolymer or ethylene-hexene-1 copolymer.

22. The sliding member according to claim 13, wherein the mixing ratio of ethylene-propylene-diene rubber/ethylene-vinyl acetate copolymer in the olefin copolymer is 47-53/53-47 (by weight).

23. The sliding member according to claim 13, further containing a lubricant (D) in an amount of 0.1 to 10 parts by weight based on 100 parts by weight of the polyacetal resin (A).

24. The sliding member according to claim 13, wherein the lubricant (D) is a mineral oil, a hydrocarbon, a fatty acid ester, a synthetic oil, an animal oil, a vegetable oil, a metallic soap, a natural wax or a mixture thereof.

25. The sliding member according to claim 13, further containing a solid lubricant, a fibrous material, na inorganic filler or a mixture thereof in an amount of not more than 30 % by weight in the polyacetal resin composition.

* * * * *